United States Patent [19]
Chen

[11] Patent Number: 5,802,258
[45] Date of Patent: Sep. 1, 1998

[54] LOOSELY COUPLED SYSTEM ENVIRONMENT DESIGNED TO HANDLE A NON-DISRUPTIVE HOST CONNECTION SWITCH AFTER DETECTION OF AN ERROR CONDITION OR DURING A HOST OUTAGE OR FAILURE

[75] Inventor: Shawfu Chen, New Milford, Conn.

[73] Assignee: International Business Machines Corporation, Armonk, N.Y.

[21] Appl. No.: 642,715

[22] Filed: May 3, 1996

[51] Int. Cl.[6] ................................................ H01J 13/00
[52] U.S. Cl. ........................... 395/182.08; 395/182.02; 395/200.03; 395/200.09
[58] Field of Search .................... 395/182.08, 200.03, 395/200.07, 200.12, 182.02

[56] References Cited

U.S. PATENT DOCUMENTS

| | | | |
|---|---|---|---|
| 4,586,134 | 4/1986 | Norstedt | 395/200.12 |
| 4,975,914 | 12/1990 | Ashton et al. | 395/182.02 |
| 5,021,949 | 6/1991 | Morten | 395/200.09 |
| 5,084,816 | 1/1992 | Boese et al. | 395/182.02 |
| 5,088,032 | 2/1992 | Bosack | 395/200.15 |
| 5,129,080 | 7/1992 | Smith | 395/182.02 |
| 5,371,852 | 12/1994 | Attanasio et al. | 395/200.02 |
| 5,384,783 | 1/1995 | Satomi et al. | 395/182.02 |
| 5,384,840 | 1/1995 | Blatchford et al. | 379/229 |
| 5,428,783 | 6/1995 | Lake | 395/676 |
| 5,473,599 | 12/1995 | Li et al. | 395/219 |
| 5,495,582 | 2/1996 | Chen et al. | 395/200.12 |

OTHER PUBLICATIONS

Hall et al., Single System Image and Load Balancing with Parallel Session Support for Network Access to a Loosely--Coupled Processor Complex, IBM Tech. Disclosure Bul., vol. 38 No. 09, Sep. 1995, pp. 505–507.

*Primary Examiner*—Robert W. Beausoliel, Jr.
*Assistant Examiner*—Ly V. Hua
*Attorney, Agent, or Firm*—Lily Neff

[57] ABSTRACT

A system for maintaining a non-disruptive connection between a local host and a remote host is introduced that allows the re-establishment of processing communications between the remote host and a new host in case the first host originally in processing communication with the remote host experiences an outage. The present invention particularly relates to loosely coupled environments connecting to a TCP/IP network. The system uses a communication box or an offload frontend box for holding all socket associations between the remote host and the local hosts. Each socket connection associates the remote host to an application being run on the local host but maintained by the communication or the offload frontend box. The offload frontend box detects a host outage through its channel connectivity and holds all processing and communication data related to the failing host until a new connection is established between a second host and the remote host, at which time the box transfers all such data to the second replacing host.

22 Claims, 3 Drawing Sheets

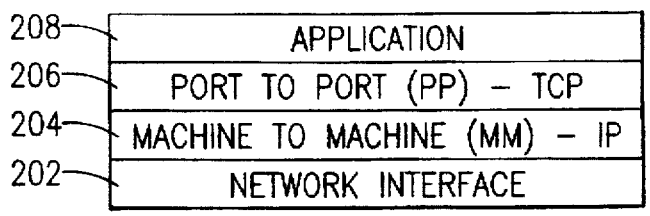
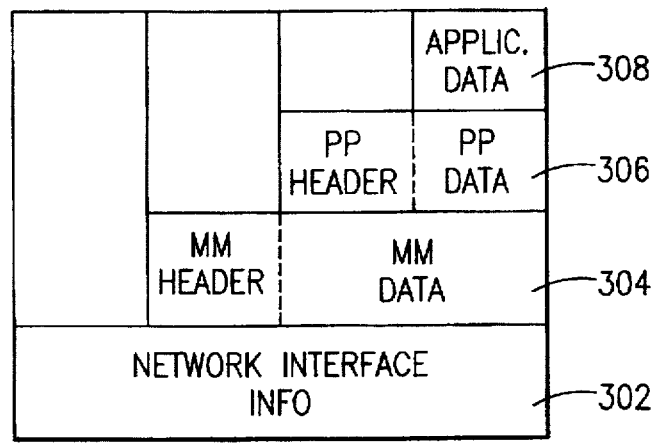
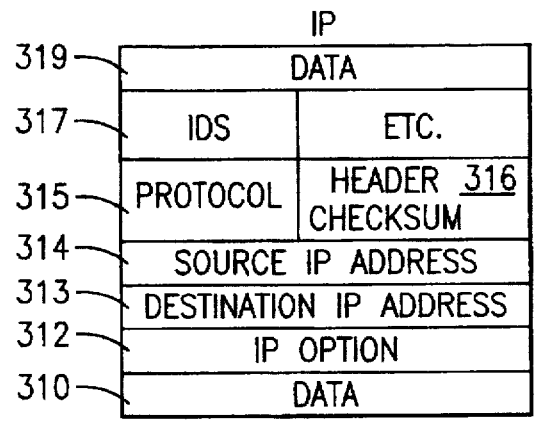
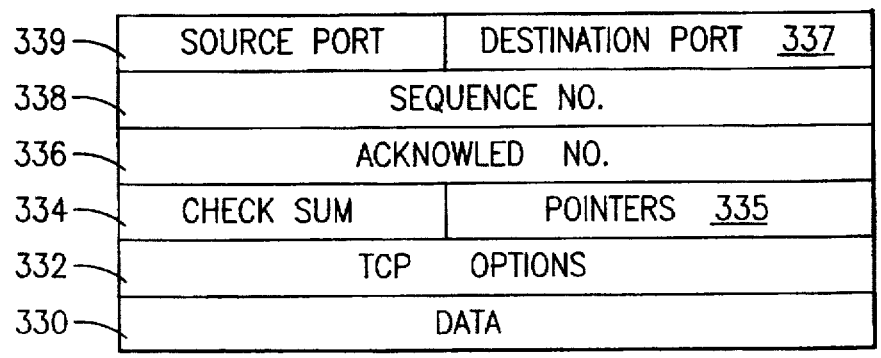

LOOSELY COUPLED SYSTEM ENVIRONMENT DESIGNED TO HANDLE A NON-DISRUPTIVE HOST CONNECTION SWITCH AFTER DETECTION OF AN ERROR CONDITION OR DURING A HOST OUTAGE OR FAILURE

FIELD OF INVENTION

This invention is directed to a system designed for maintaining a non-disruptive connection between a remote host and a host in a loosely coupled environment through use of a communication box or an Offload Frontend Box.

BACKGROUND OF THE INVENTION

Loosely coupled environments are computer system complexes that comprise of a number of processors that share data storage and communications networks. Each complex, however, retains its own dedicated memory which is not usually shared between such complexes. Each processor in the environment can access all data on the shared databases and can run any application program stored in the data storage. This allows the presentation of a single image to the remote host or user and allows workload balancing by the processor complexes. The remote host or user does not care which of the coupled processors executes the application, allowing more effective workload balancing without operator or end user action.

Data processing systems are employed within loosely coupled environments to maintain data needed in different locations throughout the environment to service the processing of different applications. The data may be maintained in one or more host systems linked to the remote hosts and to other host systems forming a network of communication links in the environment. In order to send messages from one host on the link to another host on the link, communication rules called protocols are established to control the communication by routing messages and accessing appropriate host computers on the link in the complex or the environment. These communications protocols typically exist as part of a teleprocessing architecture that defines the function and structure of data communications products.

When a remote host sets up communication with a host in order to request processing of an application, extensive time and effort go into setting up the communication link since the remote host has to be associated with the host carrying the application through the passing of certain information including the appropriate communication protocol. If the host then is unable to complete the processing of the application because of a subsequent outage, a failure or some sort of an error condition detected by the environment, the remote host has to duplicate the initial effort spent in setting communication with the now failing host in order to establish a second communication link with a replacement host. Furthermore, when a need arises to re-establish a new connection data that had been sent previously over the pre-existing connection between the remote host and the now failing host may be lost.

SUMMARY OF THE INVENTION

A system is designed for maintaining a non-disruptive connection between a remote host and a host in the loosely coupled environment through the use of a communication or an Offload Frontend Box. The system comprises a plurality of hosts and a plurality of remote hosts, with at least one of the remote hosts being in processing communication with at least a first host through the use of the communication box or Offload Frontend Box. The use of the communication box allows the remote host to re-establish communication with a second host, when the first host experiences an outage. The communication box maintains all information about all the hosts and said remote hosts connected to the system, and in case of a host outage uses this information to help re-establish a new connection between the remote host and a second replacing host. The communication box not only detects a host outage, but it also enables successful recovery and re-establishment of a new processing communication by passing the all data and processing information to the new host once the new host re-establishes communication with the remote host.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 is a block diagram showing conceptual layering of communication protocols used;

FIG. 3A through 3C shows data diagrams illustrating the type of data required to be provided in order to establish a successful communication;

DETAILED DESCRIPTION OF THE INVENTION

Figure 1:
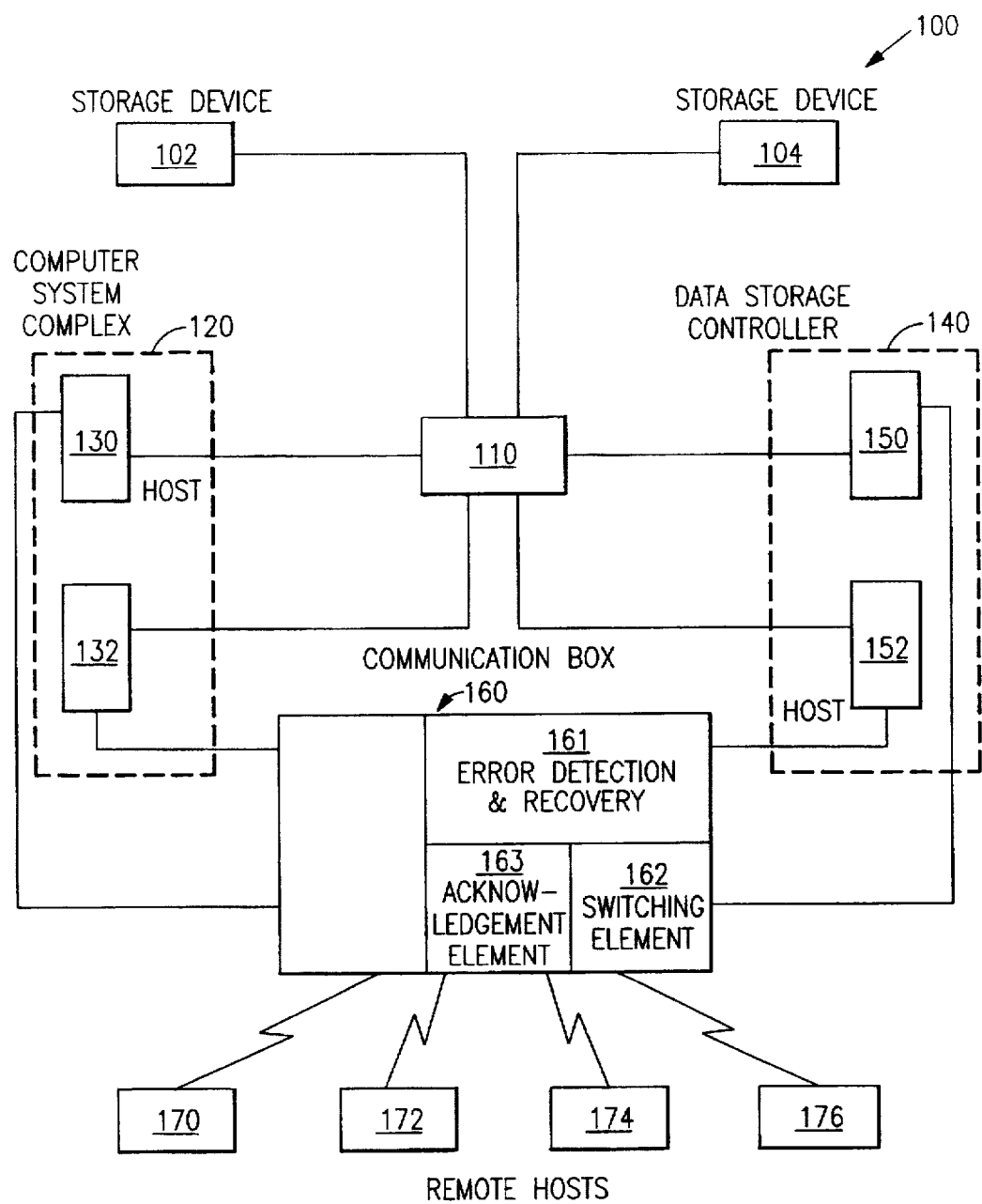
FIG. 1 is a block diagram of a loosely coupled processor environment such as the one used in the present invention.

A loosely coupled environment is shown generally in FIG. 1 as 100. The environment comprises a plurality of processor complexes 120 and 140, a plurality of data storage devices 102, 104 and at least one data storage controller 110. Each processor complex further comprises a plurality of computer systems or hosts 130, 132, 130, 152 as well as main memory and one or more processing elements and input/output channels (not shown). The processors are each a complete system as an independent complex such as IBM ES/9000 computer system in themselves (ES/9000 is a trademark of IBM Corp.) A loosely coupled environment can have two or more connected systems with eight systems being a typical number.

The computer systems or the local hosts (hereinafter hosts) share access to data storage devices through the shared data storage controller(s). The shared data storage controller and the data storage devices can be any of such devices available commercially such as IBM 3990 Disk Control Unit and IBM 3990 Disk Storage Units.

The hosts are connected through a communication box or an Offload Frontend Box 160, such as IBM 3172 communication box, to the remote hosts 170, 172, 174 and 176. The communication box performs several functions among which are the task socket/routing elements in an effort to match up the remote host with the processing host responsible for running the requested application. The remote hosts can be any type of intelligent devices such as an IBM PS/2

Personal Computer (PS/2 is a trademark of IBM Corp.) The remote hosts, however, must be capable of running a communication program to communicate with the host systems.

When a remote host sets up communication with one of the hosts for the processing of a certain application, the network of host system comprise different kinds of communication links with different kind of host computers connected to those links. In order for messages to be sent from one host on the link to another host on the link, rules, called protocols are established to control the communication links, route messages, and access appropriate host computers on the link.

The communication protocols can be conceptually viewed as being layered, as depicted in FIG. 2, with each protocol layer making use of the services provided by the layer beneath it. The lowest layer is the Network Interface 202 which deals at the hardware level and controls the transmission of data between hosts on a single network of a particular type. The next higher layer is the Machine-to-Machine (MM) 204 layer which provides the capability to communicate between hosts that are not directly connected to the same physical complex. A widely used example of this layer is an Internet Protocol (IP). Internet IP is a standard industry communication protocol which allows the use of standard software communication packages.

The next higher layer of protocol is the Port-to-Port (PP) 206 layer that allows multiple processes executing different application programs to communicate with remote processes at remote hosts all at the same time. The PP layer uses the MM protocol layer to transfer data between host machines. The PP layer presents an interface to the application layer which allocates a local communication port to a process, connects that port to a remote port on a remote host, and transfers data between the local port and the remote port. Examples of such PP transport protocols are TCP (Transmission Control Protocol), UDP (User Datagram Protocol) and XNS (Xerox Network System). TCP is capable of operating with devices using IP suite of protocol (TCP/IP).

In a preferred embodiment of the present invention, a loosely coupled environment is connected to a TCP/IP network when a connection is established between the host and the remote host, the communication protocol involves the passing of a lot of information in order to Associate a socket connected to the remote host to an application in the local host. FIGS. 3A, 3B and 3C is an example of the information that needs to be passed along in a TCP/IP type network. While FIG. 3A depicts more general information that has to be passed and established at each layer of protocol, FIGS. 3B and 3C show in more detail the information that needs to be passed for an IP type communication and a TCP type communication respectively.

The communication box or controller 160 performs as an Offload Frontend Box for offloading communication protocol processing from the loosely coupled environment. Communication protocol processing includes flow control, error detection and recovery, segregation of large messages into smaller units for communication, routing messages and other functions. The execution of such functions requires various logic such as buffer allocation, timer management, data movement and interprocess coordination. Offloading protocol processing relieves the environment's processors from consuming time and effort that can be applied to computing and data server functions.

The communication box is used as an Offload Frontend Box in order to allow a host to offload its TCP/IP functions into a TCP/IP Offload Frontend Box. In a loosely coupled environment such as the one described above connecting to TCP/IP network through the TCP/IP Offload Frontend box, when the local host takes an outage, or when the Offload Frontend box detects a failure, mismatch or an error condition, the remote host or remote TCP/IP workstation that is connected to that host will subsequently lose the connection to the host and will need to re-establish a TCP connection. This, however, will cause the remote host not only to lose the connection information such as the ones shown in FIGS. 3A through 3C, but also to lose data that has been sent over that connection including any data associated with the application itself (as depicted in FIG. 3A, 308).

The present invention, however, provides for a method of allowing the remote host to maintain communication and transfer its connection to a subsequent host when and if an outage or other conditions occur.

When a host offloads its TCP/IP functions into the TCP/IP Offload Frontend Box, a TCP/IP connection with a remote TCP/IP host really ends in the Offload Frontend Box. There is then an Association of a socket in TCP/IP Offload Frontend Box and an application in the local host that is maintained by the Offload Frontend box. When the local host processing the requested application then takes an outage or is detected to have a failure or an error condition, the Association is taken over rather than destroyed by the Offload Frontend box. By allowing the Association to be taken over, the present invention allows another local host to commence processing the application, and at the exact location where the previous host had took the outage, and re-establish the Association. The Offload Frontend Box can thus forward data to the new host without breaking current connection with the remote host. This accomplishes a non-disruptive connection re-establishment causing the remote host to switch to another host (through the switching element as shown in FIG. 1 at 162) without any efforts on the part of the remote host, which in turn achieves greater availability of the environment without a need to add software to all remote TCP/IP hosts.

Figure 4:
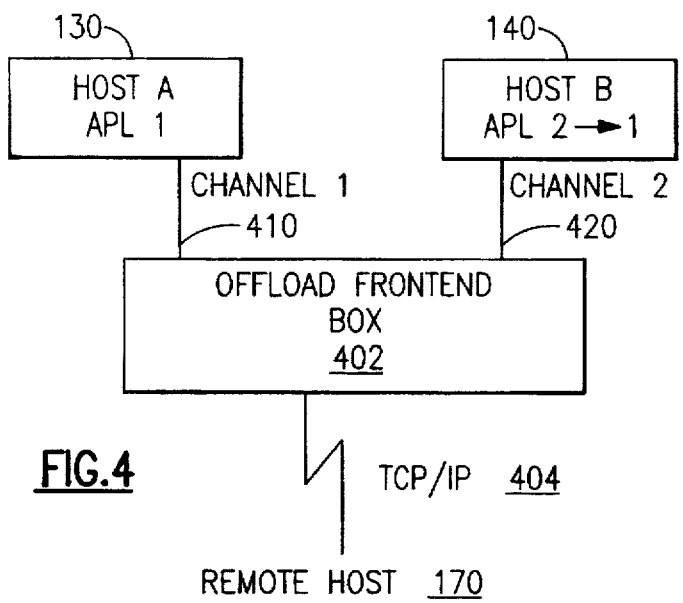
FIG. 4 is a functional block diagram of the present invention illustrating the connection between two hosts and a remote host through an Offload Frontend Box.
Figure 5:
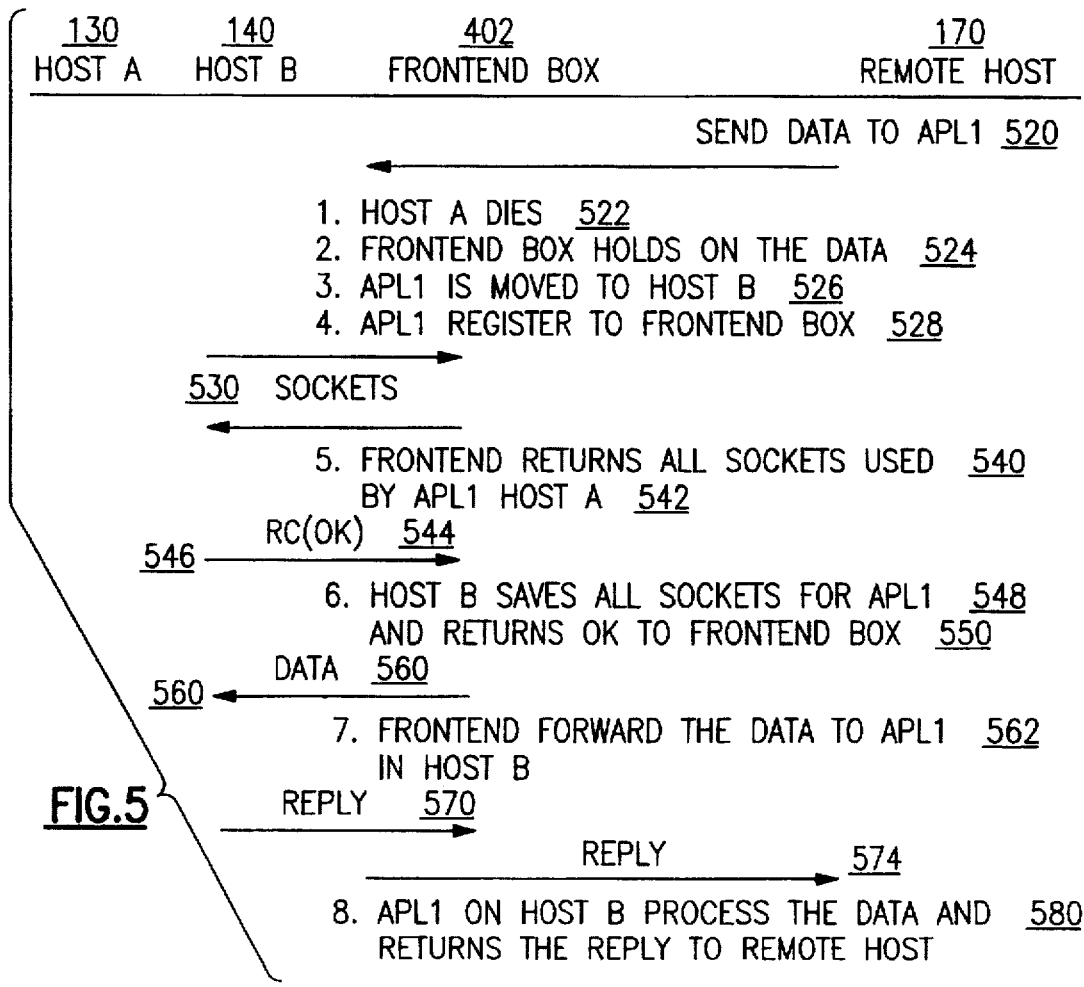
FIG. 5 is a flowchart type diagram illustrating a possible sequence of events after a host outage has been detected.

FIG. 4 and 5 depict a preferred embodiment of the present invention. Both Figures are an illustration of the functioning of the present invention depicting the procedure that ensues in a sample outage situation. FIG. 4 shows the remote host 170 having a TCP/IP connection 404 to application 1 or APL 1 in Host A 130.

In FIG. 4 loosely coupled hosts A and B 130, and 140 respectively, are connected to the TCP/IP Offload Frontend Box 402 and all physical and logical connections are established between the hosts and the Offload Frontend Box. An application running on a host, such as Apl 1, registers its existence with the Offload Frontend Box, for example through sending a socket bind () call (empty parenthesis reflect the parameters to be passed) to the Offload Frontend Box. When the Offload Frontend Box receives this information from the host, it stores it for it future use. (In one embodiment, the Offload Frontend Box builds an incore table for holding information about a host application port number, local socket descriptor, host socket descriptor and an assigned address that associates with the host. All such information is kept in the core report until the Offload Frontend Box is powered off.)

A TCP connect request generally arrives at the Offload Frontend Box with the port number of a host application and an IP address of a host waiting to be accepted by the host application. The host application then acknowledges the request, for example by issuing an accept () call, to the Offload Frontend Box. The Offload Frontend Box checks the information provided such as the port number and the (IP) address before assigning a new socket descriptor for the connection. This new socket descriptor associates the local host application to the remote host application connection.

During normal operations, once the connection is established, data sent by hosts is passed with certain parameters to the Offload Frontend Box. The Offload Frontend Box then looks at the parameters passed along with the data and forward the data to the internet. For data arrived at the Offload Frontend Box, the Offload Frontend Box looks at the IP address, searches the information previously provided, such as information stored in the incore table, and determines the one host that is appropriate for delivery of the data. The Offload Frontend Box also looks at the port number and identify the application running on the host. In this way whenever the host application issues a command the Offload Frontend Box delivers the data to that application. For example if the issued command is a receive () call, the Offload Frontend Box knows to deliver the data to that particular receive () call based on the socket descriptor previously stored. Between data arrived at the Offload Frontend Box and host application issuing a receive () call to consume it, the data is queued in the Offload Frontend Box.

The Offload Frontend Box 402 detects an error when the physical or logical connection to a host is broken (through the error detection and recovery element as shown in FIG. 1 at 161). Therefore, as shown in FIG. 4, the Offload Frontend Box in this situation will detect an error through the channel connectivity 410 when Host A takes an outage (or the Frontend Box detects some other problem with Host A). In that situation the Offload Frontend Box first marks all TCP connections in the incore table relating to the host as temporarily out of service and starts a timeout clock as well. In this way the Offload Frontend Box holds all socket connections to the Apl 1 of Host A and waits for APL 1 to show up on Host B 140 (524 in FIG. 5). When APL 1 is instituted on Host B 526, and APL 1 is somewhat successfully moved to that host (Host B), Apl 1 through Host B registers itself through channel 2 420 to Offload Frontend Box (528 in FIG. 5). (This can be accomplished for example by the application in the new host issuing a socket () and bind () call when the second host is ready to replace the previous host.) The Frontend Box in this way recognizes the application by identifying the port number, even through the application is being presented through a different host.

Once Apl 1 is registered though channel 2, Offload Frontend Box returns all sockets 540 that were previously Associated with APL 1 through channel 1 410 to Apl 1 through channel 2 to Host B. For example, if an incore table is being utilized, the Offload Frontend Box updates the incore table to reflect all TCP socket descriptor changes and refresh the new socket association information. Once Apl 1 in Host B acknowledges 544 (all acknowledgments handled through acknowledge element shown in FIG. 1 at 163), 550 the acceptance of sockets, data can be forwarded to Apl 1 and processed 560. Therefore, the remote host has now re-established itself to a new host and the outage or the error condition to the initial connection has had no outage or adverse effects to the remote host. In fact the host outage is transparent to the remote host since Host B now takes over the processing of data and its returning to the remote host 580.

Although a specific embodiment of the invention has been disclosed, it will be understood by those having skill in the art that changes can be made to the specific embodiment without departing from the spirit and the scope of the invention.

What is claimed is:

1. In a loosely coupled computer environment, a system for providing non-disruptive connection switch from a first host to a second host during said first host's outage, said system comprising:
    a plurality of hosts and a plurality of remote hosts, with at least one of said remote hosts being in processing communication with at least a first host through the use of a communication box;
    said communication box maintaining all information about all said hosts and said remote hosts connected to said system;
    said communication box having error detection and recovery mechanism, as to allow said communication box to detect an error condition associated with said first host in processing communication with one of said remote host;
    said communication box having a storage location for keeping all processing data and communication information between said first host and said remote host in which it was in communication with during first host's outage until a second replacing host re-establishes processing communication through said communication box with said remote host.

2. The system of claim 1, wherein said communication box is an offload frontend box able to conduct processing communication protocol for the environment in order to allow said loosely coupled environment to conduct computation and other data server functions.

3. The system of claim 2, wherein said communication protocol is a TCP/IP protocol.

4. The system of claim 2, further comprising a plurality of channels with at least one channel being assigned to each of said hosts in said system for communication between said offload frontend box and said hosts, said offload frontend box detecting said host outages through said channels.

5. The system of claim 2, said offload frontend box having a storage location for maintaining applications for all said hosts as requested by any of said remote hosts.

6. The system of claim 5, wherein said offload frontend box has at least one socket and that said offload frontend box associates said socket to an application in said hosts, said application being maintained by said offload frontend box.

7. The system of claim 6, wherein said offload frontend box has a recovery mechanism allowing a second replacing host to re-establish an association with said remote host by taking over said association originally assigned to said first host, said offload frontend box then forwarding all processing and communication data to said remote host after said association has been taken over.

8. The system of claim 7, wherein said recovery mechanism further comprises an acknowledgment element that needs to be set before any further communication or processing data can be forwarded to said second host; said acknowledgement element being set through the receipt of a signal from said second host signifying that said second host has successfully accepted said socket assigned to said first host and processing communication has been re-established with said remote host.

9. The system of claim 1, wherein a plurality of hosts are in processing communication with a plurality of remote hosts, and at least two hosts experience an outage simultaneously.

10. The system of claim 1, wherein said communication box is an offload frontend box performing several functions.

11. The system of claim 10, wherein said functions comprise flow control, error detection and recovery and routing of message between said remote hosts and said hosts.

12. A system for maintaining a non-disruptive connection between at least one host and a remote host in a loosely coupled computer environment, said system comprising:

a plurality of hosts and a plurality of remote hosts, with at least one of said remote hosts being in processing communication with a first host through the use of a communication box;

a plurality of channel connections for connecting said communication box with said hosts;

an error detection mechanism provided in said communication box as to allow detection of a host outage through said channel connectivity between said hosts and said communication box;

said connection box having a plurality of socket connections to associate each host to an application maintained by said communication box, said applications being run by said hosts in processing communication;

a recovery mechanism provided in said communication box, said recovery mechanism having storage areas for maintaining all communication and processing data when a first processing host takes an outage until a second host re-establishes processing communication with said remote host;

said recovery mechanism further having a switching element for reassigning said socket connection for said first processing host to a second processing host upon said first host's outage.

13. The system of claim 12, wherein said recovery mechanism further comprises an acknowledgment element that needs to be set before any further communication or processing data can be forwarded to said second host; said acknowledgement element being set through the receipt of a signal from said second host signifying that said second host has successfully accepted said socket assigned to said first host and processing communication has been re-established with said remote host.

14. The system of claim 13, wherein said communication box is an offload frontend box for processing communication protocol in order to allow said loosely coupled environment to conduct computation and other data server functions.

15. The system of claim 14, wherein said communication protocol is TCP/IP protocol.

16. The system of claim 13, wherein a plurality of hosts are in processing communication with a plurality of remote hosts, and at least two hosts experience an error condition simultaneously.

17. The system of claim 12, wherein said communication box is an offload frontend box performing several functions.

18. The system of claim 17, wherein said functions comprise flow control, error detection and recovery and routing of messages between said remote hosts and said hosts.

19. A system for maintaining a non-disruptive connection between at least one host and a remote host in a loosely coupled computer environment, said system comprising:

a plurality of hosts and a plurality of remote hosts, with at least one of said remote hosts being in processing communication with a first host through the use of an offload frontend box;

said offload frontend box having communication means for processing TCP/IP protocol in order to allow said loosely coupled environment to conduct computation and other data server functions;

a plurality of channel connections for connecting said offload frontend box with said hosts;

an error detection mechanism provided in said offload frontend box as to allow detection of a host outage through said channel connections between said hosts and said offload frontend box;

said offload frontend box having a plurality of socket connections to associate each host to an application maintained by said communication box but assigned to said any processing hosts;

a recovery mechanism provided in said offload frontend box, said recovery mechanism having storage areas for maintaining all communication and processing data when a first processing host takes an outage until a second host re-establishes processing communication with said remote host;

said recovery mechanism further having a switching element for reassigning said socket connection for said first processing host to a second processing host upon said first host's outage;

said recovery mechanism further comprising an acknowledgment element that needs to be set before any further communication or processing data can be forwarded to said second host; said acknowledgement element being set through the receipt of a signal from said second host signifying that said second host has successfully accepted any socket assigned to said first host and processing communication has been re-established with said remote host.

20. The system of claim 19, wherein a plurality of remote hosts are in communication with a plurality of hosts and an error is detected simultaneously with at least two hosts, with a plurality of other hosts being available for reestablishing communication and processing relation with said plurality of remote hosts.

21. The system of claim 19, wherein said communication box is an offload frontend box performing several functions.

22. The system of claim 21, wherein functions comprise flow control, error detection and recovery and routing of messages between said remote hosts and said hosts.

* * * * *